(12) United States Patent
Holbein et al.

(10) Patent No.: US 8,970,507 B2
(45) Date of Patent: Mar. 3, 2015

(54) METHOD OF WAKING UP AND A PORTABLE ELECTRONIC DEVICE CONFIGURED TO PERFORM THE SAME

(75) Inventors: Marc Edward Holbein, Waterloo (CA); Kevin Howard Orr, Waterloo (CA); Aleksandar Sasha Papo, Waterloo (CA); Adam Louis Parco, Waterloo (CA); Christopher James Grant, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1021 days.

(21) Appl. No.: 12/572,535

(22) Filed: Oct. 2, 2009

(65) Prior Publication Data

US 2011/0080349 A1 Apr. 7, 2011

(51) Int. Cl.
*G06F 3/041* (2006.01)
*G06F 1/32* (2006.01)

(52) U.S. Cl.
CPC ............ *G06F 1/3203* (2013.01); *G06F 3/0414* (2013.01)
USPC ........... 345/173; 345/168; 345/174; 345/175; 345/177; 345/178; 345/179; 341/34; 178/18.01; 178/18.02; 178/18.03; 178/18.04; 178/18.05; 178/18.06; 178/18.07; 178/19.01; 178/19.03; 178/19.04

(58) Field of Classification Search
CPC ..... G06F 3/041; G06F 3/0412; G06F 3/0416; G06F 3/044; G06F 3/0488; G06F 3/04883; G06F 3/017; G06F 3/016; G06F 3/03545; G06F 3/0418; G06F 1/1692
USPC ......... 345/173, 174, 175, 177, 178, 179, 168; 338/68; 178/18.01–18.08
See application file for complete search history.

(56) References Cited

U.S. PATENT DOCUMENTS 5,900,875 A 5/1999 Haitani et al.
6,269,449 B1 7/2001 Kocis
(Continued)

FOREIGN PATENT DOCUMENTS

EP 1785808 5/2007
WO WO 2006133018 12/2006
WO WO 2009091873 7/2009

OTHER PUBLICATIONS

New smart sensor from STMicroelectronics translates finger hits into actions, http://www.epn-online.com/page/0352/new-smart-sensor-from-stmicroelectronics-translates-finger-hits-into-actions.html, Jun. 22, 2007.
(Continued)

*Primary Examiner* — Olga Merkoulova
(74) *Attorney, Agent, or Firm* — Ridout & Maybee LLP

(57) ABSTRACT

Methods of waking a portable electronic device are disclosed. In one embodiment, the method comprises: causing the portable electronic device to enter a sleep mode in which a touch-sensitive display is deactivated a force sensing transducer measures forces applied to the touch-sensitive display at a reduced rate relative to a rate of a full power mode when in the sleep mode; causing a force sensing transducer to measure forces applied to the touch-sensitive display at the rate of the full power mode in response to detection of an inertial event; causing the touch-sensitive display to be reactivated in response to detection of a force which is greater than a predetermined wake force threshold; and causing the portable electronic device to wake in response to detection of a touch event within a first predetermined duration of the detection of the force which is greater than a predetermined wake force threshold.

19 Claims, 10 Drawing Sheets

(56) References Cited

U.S. PATENT DOCUMENTS

| | | | |
|---|---|---|---|
| 6,300,946 B1 | 10/2001 | Lincke et al. | |
| 6,448,988 B1 | 9/2002 | Haitani et al. | |
| 6,492,979 B1 * | 12/2002 | Kent et al. | 345/173 |
| 6,504,530 B1 * | 1/2003 | Wilson et al. | 345/173 |
| 6,573,886 B1 | 6/2003 | Lehtinen et al. | |
| 6,601,111 B1 | 7/2003 | Peacock et al. | |
| 6,943,813 B2 | 9/2005 | Haitani et al. | |
| 6,996,784 B2 | 2/2006 | Haitani et al. | |
| 7,084,762 B2 | 8/2006 | Pedrazzini et al. | |
| 7,176,902 B2 | 2/2007 | Peterson, Jr. et al. | |
| 7,196,694 B2 * | 3/2007 | Roberts | 345/173 |
| 7,199,783 B2 | 4/2007 | Wenstrand et al. | |
| 7,386,858 B1 | 6/2008 | Peacock et al. | |
| 7,469,387 B1 | 12/2008 | Haitani et al. | |
| 7,487,470 B2 | 2/2009 | Haitani et al. | |
| 7,606,552 B2 * | 10/2009 | Orr et al. | 455/343.1 |
| 2002/0175836 A1 * | 11/2002 | Roberts | 341/34 |
| 2004/0155860 A1 * | 8/2004 | Wenstrand et al. | 345/156 |
| 2006/0138983 A1 | 6/2006 | Lee | |
| 2006/0146038 A1 | 7/2006 | Park et al. | |
| 2006/0240772 A1 | 10/2006 | Schoening et al. | |
| 2006/0244730 A1 | 11/2006 | Jam et al. | |
| 2006/0279548 A1 | 12/2006 | Geaghan | |
| 2006/0284857 A1 * | 12/2006 | Oh | 345/173 |
| 2007/0054651 A1 * | 3/2007 | Farmer et al. | 455/352 |
| 2007/0102525 A1 * | 5/2007 | Orr et al. | 235/472.01 |
| 2007/0123738 A1 | 5/2007 | Tokuyasu et al. | |
| 2007/0234092 A1 | 10/2007 | Freeman et al. | |
| 2008/0123267 A1 | 5/2008 | Orr et al. | |
| 2009/0009478 A1 | 1/2009 | Badali et al. | |
| 2009/0014526 A1 | 1/2009 | Rusman et al. | |
| 2009/0146533 A1 * | 6/2009 | Leskinen et al. | 310/338 |
| 2009/0207147 A1 | 8/2009 | Perrot et al. | |
| 2009/0239581 A1 | 9/2009 | Lee | |

OTHER PUBLICATIONS

Samsung S5600 and S5230 TouchScreen Phones, http://www.hardwaresphere.com/2009/03/09/samsung-s5600-s5230-touchscreen-phones/, Mar. 9, 2009.

Review: LG Voyager, http://www.phonescoop.com/articles/article.php?a=175&p=134, at least as early as Aug. 14, 2009.

New Smart Sensor from STMicroelectronics Translates Finger Hits into Actions, http://news.thomasnet.com/fullstory/522634, Jun. 15, 2007.

Communication Purusant to Article 94(3) EPC, EP 09172145.6; Dated Oct. 19, 2011.

Examination Report, EP 09172145.6, Mar. 15, 2011.

Lam, Dominic—Canadian Intellectual Property Office, "Examiner's Requisition" for corresponding Canadian Patent Application No. 2,716,699, dated Jan. 14, 2013, Canada.

Lam, Dominic—Canadian Intellectual Property Office, "Examiner's Requisition" for Canadian Patent Application No. 2,716,699 dated Dec. 13, 2013.

* cited by examiner

METHOD OF WAKING UP AND A PORTABLE ELECTRONIC DEVICE CONFIGURED TO PERFORM THE SAME

TECHNICAL FIELD

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth™ capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. The power consumed by touch-sensitive displays is a relatively large portion of the total power draw for the device. Accordingly, improvements which reduce the power consumption of touch-sensitive displays of portable electronic devices are desirable.

DETAILED DESCRIPTION OF EXAMPLE EMBODIMENTS

Figure 1:
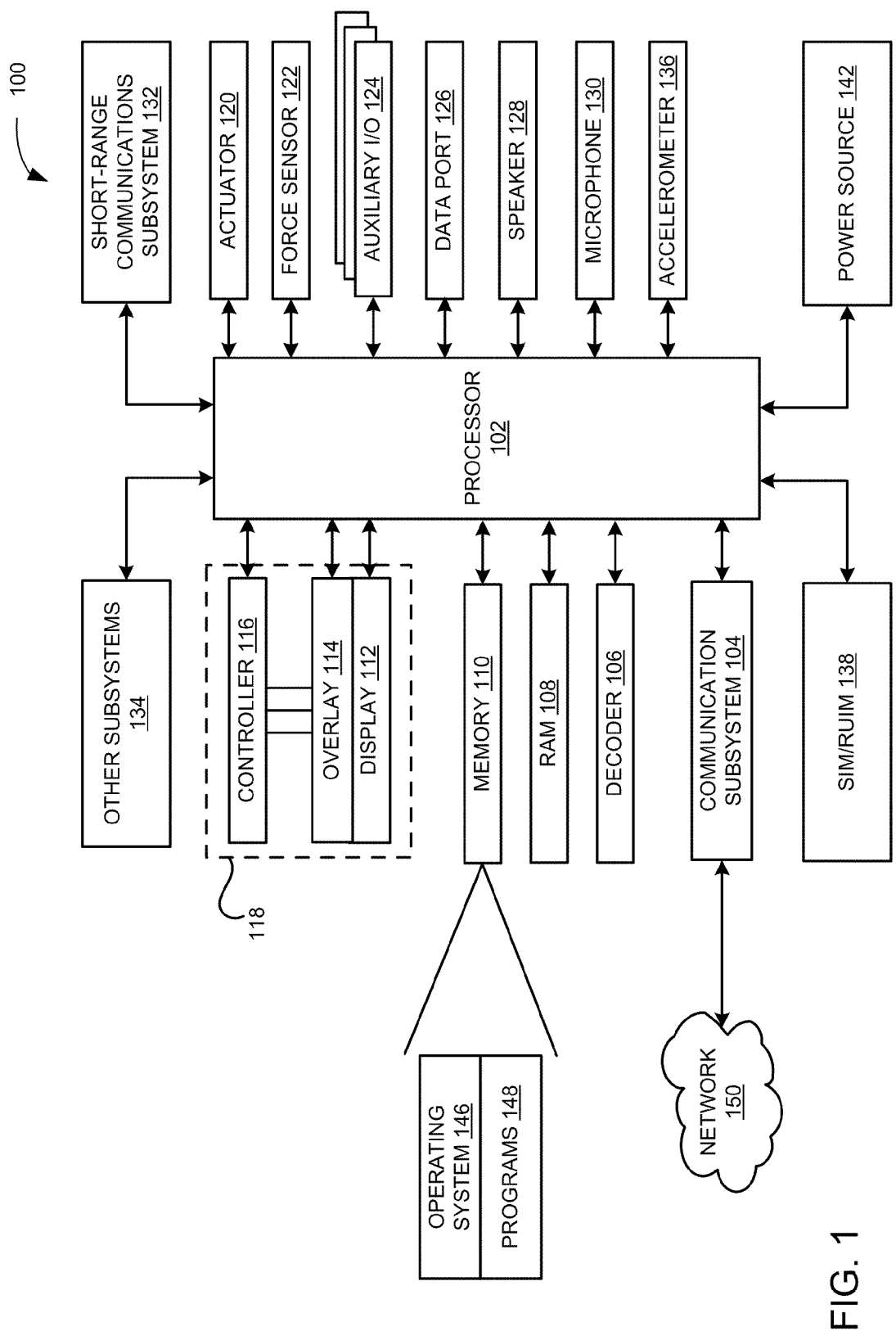
FIG. 1 is a simplified block diagram of components including internal components of a portable electronic device according to one aspect.

The present disclosure provides a wakeup detection circuit, and in particular, a low power wakeup detection circuit, and a portable electronic device having such wakeup detection circuits. Portable electronic devices may have several power modes: a "full power" mode (also referred to as an "on mode" or "normal" mode) in which normal full functionality of the device is provided; a sleep mode (also referred to as a "low power" mode or "standby" mode) in which reduced functionality of the device is provided; and an "off mode" in which the device is powered-off and performs no functions or a minimized set of functions. To exit the sleep mode or off mode, portable electronic devices having a touch-sensitive display typically periodically scan the touch-sensitive display to detect a touch event. When a touch event is detected, the device switches from the sleep mode or off mode to the full power mode. Periodic scanning of the touch-sensitive display consumes scarce power. The present disclosure provides a wakeup detection circuit which does not require periodic scanning of the touch-sensitive display. The present disclosure also provides a method of waking a portable electronic device and a portable electronic device configured to perform the same.

In accordance with one embodiment, there is provided a method of conserving power on a portable electronic device, the portable electronic device having a device housing which comprises a touch-sensitive display, an accelerometer, and a force sensing transducer, the method comprising: causing the portable electronic device to enter a sleep mode in response to a trigger condition, wherein the touch-sensitive display is deactivated in the sleep mode and the force sensing transducer measures forces applied to the touch-sensitive display at a reduced rate relative to a rate of a full power mode when in the sleep mode; detecting an inertial event using the accelerometer; causing the force sensing transducer to measure forces applied to the touch-sensitive display at the rate of the full power mode in response to detection of an inertial event; detecting forces applied to the touch-sensitive display using the force sensing transducer at the rate of the full power mode; causing the touch-sensitive display to be reactivated in response to detection of a force which is greater than a predetermined wake force threshold; detecting touch events on the touch-sensitive display; and causing the portable electronic device to wake from the sleep mode in response to detection of a touch event within a first predetermined duration of the detection of the force which is greater than a predetermined wake force threshold.

In accordance with another embodiment, there is provided a method of conserving power on a portable electronic device, the portable electronic device having a device housing which comprises a touch-sensitive display and a force sensing transducer, the method comprising: causing the portable electronic device to enter a sleep mode in response to a trigger condition, wherein the touch-sensitive display is deactivated in the sleep mode; detecting forces applied to the touch-sensitive display using the force sensing transducer; causing the touch-sensitive display to be reactivated in response to detection of a force which is greater than a predetermined wake force threshold; detecting touch events on the touch-sensitive display; and causing the portable electronic device to wake from the sleep mode in response to detection of a touch event within a first predetermined duration of the detection of the force which is greater than a predetermined wake force threshold.

In accordance with a further embodiment, there is provided a method of conserving power on a portable electronic device, the portable electronic device having a device housing which comprises a touch-sensitive display, an accelerometer, and a force sensing transducer, the method comprising: causing the portable electronic device to enter a sleep mode in response to a trigger condition, wherein the touch-sensitive display is deactivated in the sleep mode and the force sensing transducer measures forces applied to the touch-sensitive display at a reduced rate relative to a rate of a full power mode when in the sleep mode; detecting an inertial event using the accelerometer;
causing the force sensing transducer to measure forces applied to the touch-sensitive display at the rate of the full power mode in response to detection of an inertial event; detecting forces applied to the touch-sensitive display using the force sensing transducer at the rate of the full power mode; and causing the touch-sensitive display to be reactivated and causing the portable electronic device to wake from the sleep mode in response to detection of a touch event within a first predetermined duration of the detection of the force which is greater than a predetermined wake force threshold.

In accordance with a further embodiment, there is provided a method of conserving power on a portable electronic device, the portable electronic device having a device housing which comprises a touch-sensitive display and an accelerometer, the method comprising: causing the portable electronic device to enter a sleep mode in response to a trigger condition, wherein the touch-sensitive display is deactivated in the sleep mode; detecting an inertial event using the accelerometer; causing the touch-sensitive display to be reactivated in response to detection of an inertial event; detecting touch events on the touch-sensitive display; and causing the portable electronic device to wake from the sleep mode in response to detection of a touch event within a first predetermined duration of the detection of inertial event.

In some embodiments, the portable electronic device comprises a plurality of piezoelectric elements resiliently biased and located beneath the back side of the touch-sensitive display opposite to the touch-sensitive overlay of the touch-sensitive display, the movement of the touch-sensitive display being caused by modulating the charge of the piezoelectric elements thereby providing haptic feedback which simulates the collapse of a dome-type switch. In some embodiments, the plurality of piezoelectric elements comprise four piezoelectric disks, each piezoelectric disk being located near a respective corner of the touch-sensitive display.

In some embodiments in which the portable electronic device comprises a force sensing transducer, the force sensing transducer is located beneath a back side of the touch-sensitive display opposite to a touch-sensitive overlay of the touch-sensitive display, the force sensing transducer measuring forces applied to the touch-sensitive overlay of the touch-sensitive display. In some embodiments, the portable electronic device comprises a plurality of force sensing transducers, wherein a sum of force data measured by the force sensing transducers is used to determine whether an applied force is greater than the predetermined wake force threshold. In some embodiments, the force sensing transducers are force sensing resistors. In some embodiments, the force sensing transducers comprise four force sensing resistors, each force sensing resistor being located near a respective corner of the touch-sensitive display.

In accordance with further embodiments, there is provided a portable electronic device having a device housing in which a controller is received and which comprises a touch-sensitive display, and one or both of an accelerometer or force sensing transducer, the controller being configured to perform any one of the methods described herein.

In accordance with one example embodiment, there is provided a portable electronic device, comprising: a housing; a processor received within the housing; a touch-sensitive display connected to the processor and exposed by the housing, the touch-sensitive display having a touch-sensitive overlay detecting touch events; an accelerometer received within the housing connected to the controller and measuring inertial events; at least one force sensing transducer located below the touch-sensitive display on an opposite side to the touch-sensitive overlay, the at least one force sensing transducer being connected to the controller and measuring forces applied to the touch-sensitive display; wherein the controller is configured for: causing the portable electronic device to enter a sleep mode in response to a trigger condition, wherein the touch-sensitive display is deactivated in the sleep mode and the force sensing transducer measures forces applied to the touch-sensitive display at a reduced rate relative to a rate of a full power mode when in the sleep mode; detecting an inertial event using the accelerometer; causing the force sensing transducer to measure forces applied to the touch-sensitive display at the rate of the full power mode in response to detection of an inertial event; detecting forces applied to the touch-sensitive display using the force sensing transducer at the rate of the full power mode; causing the touch-sensitive display to be reactivated in response to detection of a force which is greater than a predetermined wake force threshold; detecting touch events on the touch-sensitive display; and causing the portable electronic device to wake from the sleep mode in response to detection of a touch event within a first predetermined duration of the detection of the force which is greater than a predetermined wake force threshold.

In accordance with a further embodiment, there is provided a control circuit, comprising: a control circuit, comprising: a controller having a full power duty cycle and a slower sleep mode duty cycle, the full power duty cycle and sleep mode duty cycle each having an active portion in which data is read and an inactive portion in which data is not read; a plurality of force sensing transducers for measuring force data which are connected to the controller; a multi-port switch which sums the force data output of the plurality of force sensing transducers, the multi-port switch having a switch for each of the force sensing transducers, a respective switch for each of the force sensing transducers being closed during an active portion of the sleep duty cycle and the respective switch for each of the force sensing transducers being open during the inactive portion of the sleep duty cycle; and a comparator for comparing the summed force data from the multi-port switch to a wakeup force threshold; wherein the controller is configured to wake from a sleep mode and return to a full power mode when the summed force data is greater than the wakeup force threshold.

In accordance with a further embodiment, there is provided a portable electronic device, comprising: a housing; a controller received within the housing; a touch-sensitive display having a touch-sensitive overlay, the touch-sensitive display being mechanically constrained by the housing; at least one force sensing transducer located below the touch-sensitive display on an opposite side to the touch-sensitive overlay, the at least one force sensing transducer being connected to the controller and measuring forces applied to the touch-sensitive display; wherein the controller is configured for: initiating a sleep mode from a full power mode in response to a trigger; when in the sleep mode, reading force data measured by the at least one force sensing transducer at a reduced duty cycle relative to the full power mode, comparing the force data to a wakeup force threshold, and returning to the full power mode from the sleep mode when the force data is greater than the wakeup force threshold.

In accordance with a further embodiment, there is provided a control circuit, comprising: a controller having a full power duty cycle and a slower sleep mode duty cycle, the full power duty cycle and sleep mode duty cycle each having an active portion in which data is read and an inactive portion in which data is not read; at least one force sensing transducer for measuring force data which is connected to the controller; a switch connected to the at least one force sensing transducer which is closed during an active portion of the sleep duty cycle and open during the inactive portion of the sleep duty cycle; and a comparator for comparing the force data from the switch to a wakeup force threshold; wherein the controller is configured to wake from a sleep mode and return to a full power mode when the force data is greater than the wakeup force threshold.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)) with a touch-sensitive overlay 114 operably connected to an electronic controller 116 that together comprise a touch-sensitive display 118, one or more actuators 120, one or more force sensors 122, one or more auxiliary input/output (I/O) subsystems 124, a data port 126, a speaker 128, a microphone 130, short-range communications subsystem 132, and other device subsystems 134. It will be appreciated that the electronic controller 116 of the touch-sensitive display 118 need not be physically integrated with the touch-sensitive overlay 114 and display screen 112. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces. Instead of an accelerometer 136, another type of inertial sensor could be used in other embodiments.

The portable electronic device 100 also includes one or more clocks including a system clock (not shown) and sleep clock (not shown). In other embodiments, a single clock can operate as both system clock and sleep clock. The sleep clock is a lower power, lower frequency clock. By way of example, the system clock may comprise a voltage controlled oscillator operating at a frequency of approximately 700 to 800 megahertz (though the speed of the system clock may vary depending on the mode of the portable electronic device 100), whereas the sleep clock may comprise a low power oscillator operating at a frequency in the range of 30 kilohertz to 60 kilohertz. In one example embodiment, the sleep clock operates at 32 kilohertz to reduce the power consumption.

The auxiliary I/O subsystems 124 could include other input devices such as one or more control keys, a keyboard or keypad, navigational tool (input device), or both. The navigational tool could be a clickable/depressible trackball or scroll wheel, or touchpad. The other input devices could be included in addition to, or instead of, the touch-sensitive display 118, depending on the embodiment.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
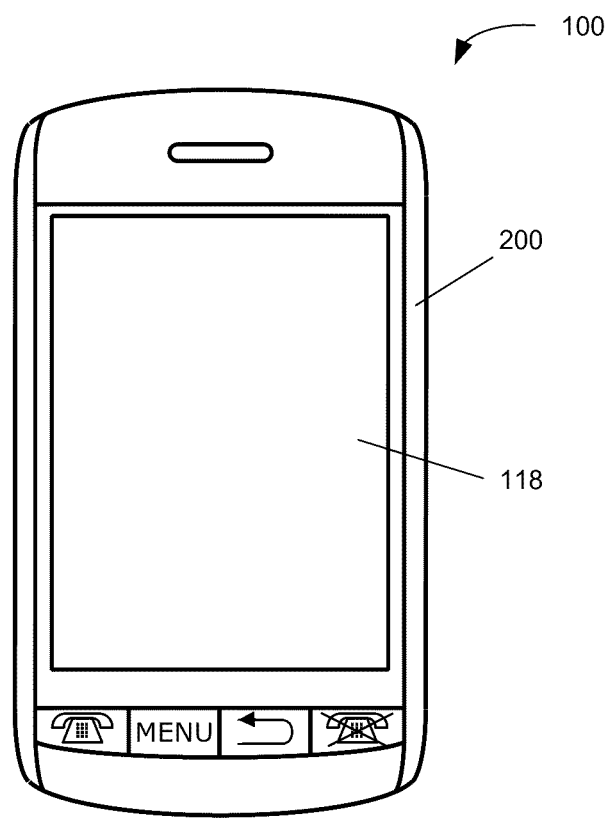
FIG. 2 is a front view of an example of a portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuators 120 comprise one or more piezoelectric devices that provide tactile feedback for the touch-sensitive display 118. The actuators 120 may be depressed by applying sufficient force to the touch-sensitive display 118 to overcome the actuation force of the actuators 120. The actuators 120 may be actuated by pressing anywhere on the touch-sensitive display 118. The actuator 120 may provide input to the processor 102 when actuated. Contraction of the piezoelectric actuators applies a spring-like force, for example, opposing a force externally applied to the touch-sensitive display 118. Each piezoelectric actuator includes a piezoelectric device, such as a piezoelectric (PZT) ceramic disk adhered to a metal substrate. The metal substrate bends when the PZT disk contracts due to build up of charge at the PZT disk or in response to a force, such as an external force applied to the touch-sensitive display 118. The charge may be adjusted by varying the applied voltage or current, thereby controlling the force applied by the piezoelectric disks. The charge on the piezoelectric actuator may be removed by a controlled discharge current that causes the PZT disk to expand, releasing the force thereby decreasing the force applied by the piezoelectric disks. The charge may advantageously be removed over a relatively short period of time to provide tactile feedback to the user. Absent an external force and absent a charge on the piezoelectric disk, the piezoelectric disk may be slightly bent due to a mechanical preload.

Figure 3A:
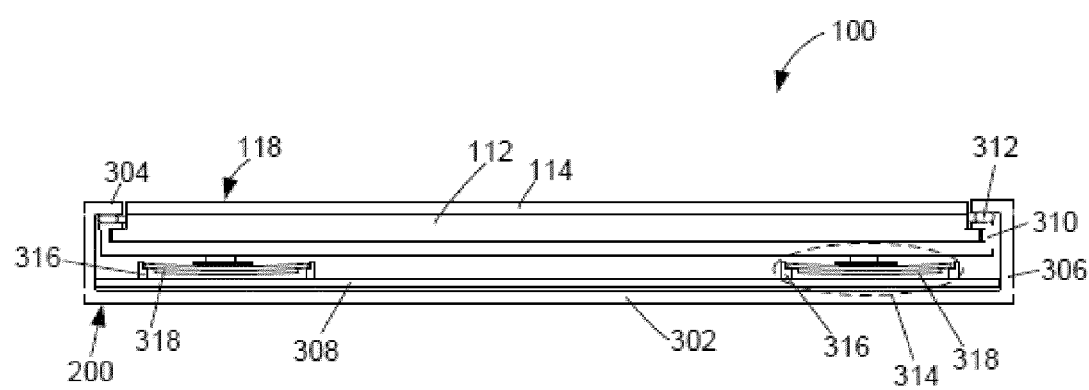
FIG. 3A is a sectional side view of portions of the portable electronic device of FIG. 2.
Figure 3B:
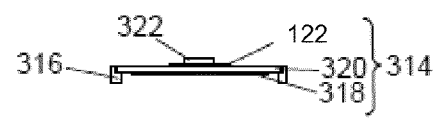
FIG. 3B is a side view of a portion of the portable electronic device shown in FIG. 3A.

The housing 200 can be any suitable housing for the internal components shown in FIG. 1. FIG. 3A shows a sectional side view of portions of the portable electronic device 100 and FIG. 3B shows a side view of a portion of the actuators 120. The housing 200 in the present example includes a back 302, a frame 304, which frames the touch-sensitive display 118 and sidewalls 306 that extend between and generally perpendicular to the back 302 and the frame 304. A base 308 is spaced from and is generally parallel to the back 302. The base 308 can be any suitable base and can include, for example, a printed circuit board or flexible circuit board supported by a stiff support between the base 308 and the back 302. The back 302 may include a plate (not shown) that is releasably attached for insertion and removal of, for example, the power source 142 and the SIM/RUIM card 138 referred to above. It will be appreciated that the back 302, the sidewalls 306 and the frame 304 may be injection molded, for example. In the example of the portable electronic device 100 shown in FIG. 2, the frame 304 is generally rectangular with rounded corners, although other shapes are possible.

The display screen 112 and the touch-sensitive overlay 114 are supported on a support tray 310 of suitable material such as magnesium for providing mechanical support to the display screen 112 and touch-sensitive overlay 114. A compliant spacer such as a gasket compliant 312 is located around the perimeter of the frame 304, between an upper portion of the support tray 310 and the frame 304 to provide a gasket for protecting the components housed in the housing 200 of the portable electronic device 100. A suitable material for the compliant gasket 312 includes, for example, a cellular urethane foam for providing shock absorption, vibration damping and a suitable fatigue life. In some embodiments, a number of compliant spacers may be used to provide the function of the gasket compliant 312.

Figure 4:
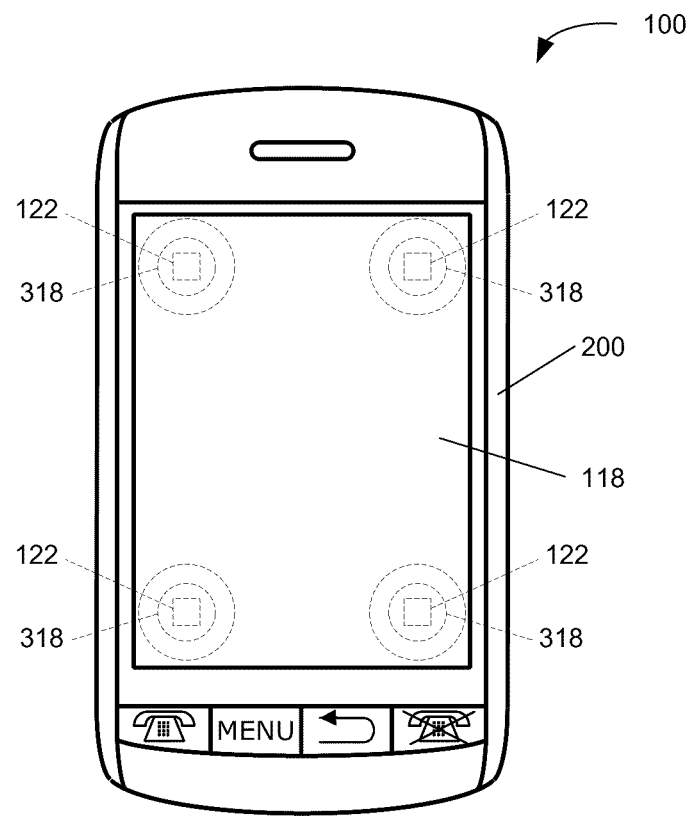
FIG. 4 is a front view of an example of a portable electronic device in a portrait orientation, showing hidden detail in ghost outline.

The actuators 120 includes four piezoelectric disk actuators 314, as shown in FIG. 4, with each piezoelectric disk actuator 314 located near a respective corner of the touch-sensitive display 118. Referring again to FIGS. 3A and 3B, each piezoelectric disk actuator 314 is supported on a respective support ring 316 that extends from the base 308 toward the touch-sensitive display 118 for supporting the respective piezoelectric disk actuator 314 while permitting flexing of the piezoelectric disk actuator 314. Each piezoelectric disk actuator 314 includes a piezoelectric disk 318 such as a PZT ceramic disk adhered to a metal substrate 320 of larger diameter than the piezoelectric disk 318 for bending when the piezoelectric disk 318 contracts as a result of build up of charge at the piezoelectric disk 318. Each piezoelectric disk actuator 314 is supported on the respective support ring 316 on one side of the base 308, near respective corners of the metal substrate 320, base 308 and housing 200. The support 316 ring is sized such that the edge of the metal substrate 320 contacts the support ring 316 for supporting the piezoelectric disk actuator 314 and permitting flexing of the piezoelectric disk actuator 314.

A shock-absorbing element 322, which in the present example is in the form of a cylindrical shock-absorber of suitable material such as a hard rubber is located between the piezoelectric disk actuator 314 and the support tray 310. A respective force sensor 122 is located between each shock-absorbing element 322 and the respective piezoelectric disk actuator 314. A suitable force sensor 122 includes, for example, a puck-shaped force sensing resistor for measuring applied force (or pressure). It will be appreciated that a force can be determined using a force sensing resistor as an increase in pressure on the force sensing resistor results in a decrease in resistance (or increase in conductance). In the portable electronic device 100, each piezoelectric disk actuator 314 is located between the base 308 and the support tray 310 and force is applied on each piezoelectric disk actuator 314 by the touch-sensitive display 118, in the direction of the base 308, causing bending of the piezoelectric disk actuator 314. Thus, absent an external force applied by the user, for example by pressing on the touch-sensitive display 118, and absent a charge on the piezoelectric disk actuator 314, the piezoelectric disk actuator 314 undergoes slight bending. An external applied force in the form of a user pressing on the touch-sensitive display 118 during a touch event, and prior to actuation of the piezoelectric disk actuator 314, causes increased bending of the piezoelectric disk actuator 314 and the piezoelectric disk actuator 314 applies a spring force against the touch-sensitive display 118. When the piezoelectric disk 318 is charged, the piezoelectric disk 318 shrinks and causes the metal substrate 320 and piezoelectric disk 318 to apply a further force, opposing the external applied force, on the touch-sensitive display 118 as the piezoelectric actuator 314 straightens.

Each of the piezoelectric disk actuators 314, shock absorbing elements 322 and force sensors 122 are supported on a respective one of the support rings 316 on one side of the base 308. The support rings 316 can be part of the base 308 or can be supported on the base 308. The base 308 can be a printed circuit board while the opposing side of the base 308 provides mechanical support and electrical connection for other components (not shown) of the portable electronic device 100. Each piezoelectric disk actuator 314 is located between the base 308 and the support tray 310 such that an external applied force on the touch-sensitive display 118 resulting from a user pressing the touch-sensitive display 118 can be measured by the force sensors 122 and such that the charging of the piezoelectric disk actuator 314 causes a force on the touch-sensitive display 118, away from the base 308.

In the present embodiment each piezoelectric disk actuator 314 is in contact with the support tray 310. Thus, depression of the touch-sensitive display 118 by user application of a force thereto is determined by a change in resistance at the force sensors 122 and causes further bending of the piezoelectric disk actuators 314 as shown in FIG. 3A. Further, the charge on the piezoelectric disk actuator 314 can be modulated to control the force applied by the piezoelectric disk actuator 314 on the support tray 310 and the resulting movement of the touch-sensitive display 118. The charge can be modulated by modulating the applied voltage or current. For example, a current can be applied to increase the charge on the piezoelectric disk actuator 314 to cause the piezoelectric disk 318 to contract and to thereby cause the metal substrate 320 and the piezoelectric disk 318 to straighten as referred to above. This charge therefore results in the force on the touch-sensitive display 118 for opposing the external applied force and movement of the touch-sensitive display 118 away from the base 308. The charge on the piezoelectric disk actuator 314 can also be removed via a controlled discharge current causing the piezoelectric disk 318 to expand again, releasing the force caused by the electric charge and thereby decreasing the force on the touch-sensitive display 118, permitting the touch-sensitive display 118 to return to a rest position.

Figure 5:
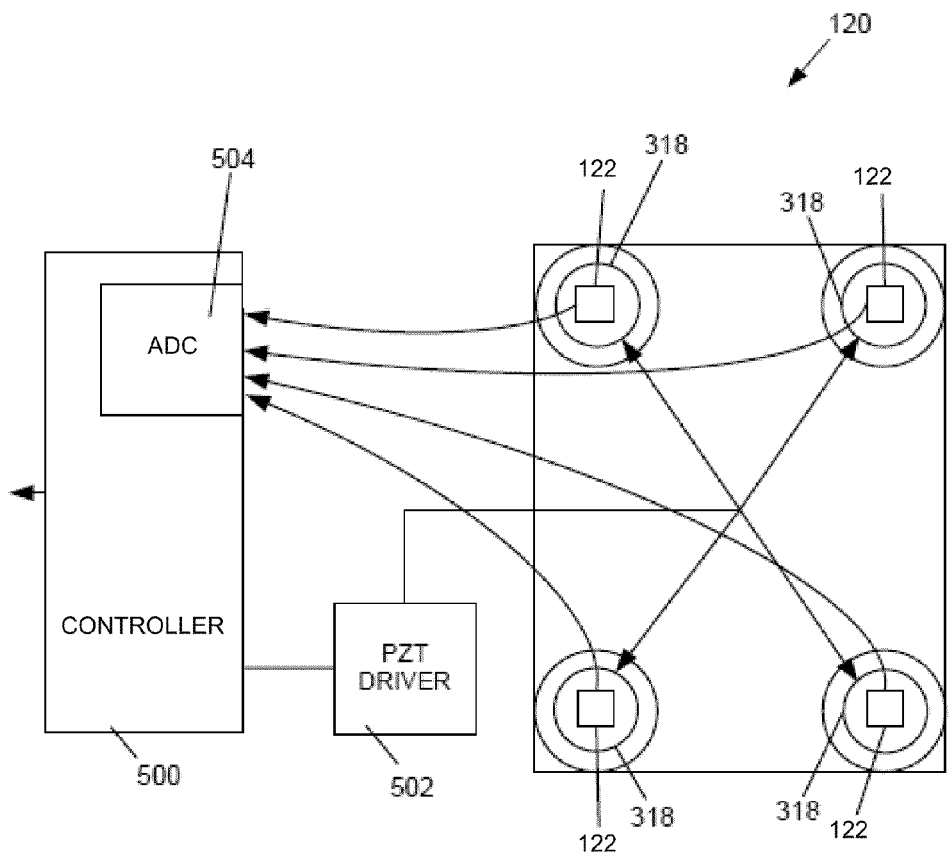
FIG. 5 is a block diagram of a circuit for controlling the actuators of the portable electronic device in accordance with one example embodiment of the present disclosure.

FIG. 5 shows a circuit for controlling the actuators 120 of the portable electronic device 100 according to one embodiment. As shown, each of the piezoelectric disks 318 is connected to a controller 500 such as a microprocessor including a piezoelectric driver 502 and an amplifier and analog-to-digital converter (ADC) 504 that is connected to each of the force sensors 122 and to each of the piezoelectric disks 318. In some embodiments, the ADC 504 could be a 9-channel ADC. The controller 500 is also in communication with the main processor 102 of the portable electronic device 100. The controller 500 can provide signals to the main processor 102 of the portable electronic device 100. It will be appreciated that the piezoelectric driver 502 may be embodied in drive circuitry between the controller 500 and the piezoelectric disks 318.

The mechanical work performed by the piezoelectric disk actuator 314 can be controlled to provide generally consistent force and movement of the touch-sensitive display 118 in response to detection of an applied force on the touch-sensitive display 118 in the form of a touch, for example. Fluctuations in mechanical work performed as a result of, for example, temperature, can be reduced by modulating the current to control the charge.

The controller 500 controls the piezoelectric driver 502 for controlling the current to the piezoelectric disks 318, thereby controlling the charge. The charge is increased to increase the force on the touch-sensitive display 118 away from the base 308 and decreased to decrease the force on the touch-sensitive display 118, facilitating movement of the touch-sensitive display 118 toward the base 308. In the present example, each of the piezoelectric disk actuators 314 are connected to the controller 500 through the piezoelectric driver 502 and are all controlled equally and concurrently. Alternatively, the piezoelectric disk actuators 314 can be controlled separately.

The portable electronic device 100 is controlled generally by monitoring the touch-sensitive display 118 for a touch event thereon, and modulating a force on the touch-sensitive display 118 for causing a first movement of the touch-sensitive display 118 relative to the base 308 of the portable electronic device 100 in response to detection of a touch event. The force is applied by at least one of the piezoelectric disk actuators 314, in a single direction on the touch-sensitive input surface of the touch-sensitive display 118. In response to determination of a touch event, the charge at each of the piezoelectric disks 318 is modulated to modulate the force applied by the piezoelectric disk actuators 314 on the touch-sensitive display 118 and to thereby cause movement of the touch-sensitive display 118 for simulating the collapse of a dome-type switch. When the end of the touch event is detected, the charge at each of the piezoelectric disks 318 is modulated to modulate the force applied by the piezoelectric disk actuators 314 to the touch-sensitive display 118 to cause movement of the touch-sensitive display 118 for simulating release of a dome-type switch.

The touch-sensitive display 118 is moveable within the housing 200 as the touch-sensitive display 118 can be moved away from the base 308, thereby compressing the compliant gasket 312, for example. Further, the touch-sensitive display 118 can be moved toward the base 308, thereby applying a force to the piezoelectric disk actuators 314. By this arrangement, the touch-sensitive display 118 is mechanically constrained by the housing 200 and resiliently biased by the compliant gasket compliant 312. In at least some embodiments, the touch-sensitive display 118 is resiliently biased and moveable between at least a first position and a second position in response to externally applied forces wherein the touch-sensitive display 118 applies a greater force to the force sensors 122 in the second position than in the first position. The movement of the touch-sensitive display 118 in response to externally applied forces is detected by the force sensors 122.

The analog-to-digital converter 504 is connected to the piezoelectric disks 318. In addition to controlling the charge at the piezoelectric disks 318, an output, such as a voltage output, from a charge created at each piezoelectric disk 318 may be measured based on signals received at the analog to digital converter 504. Thus, when a pressure is applied to any one of the piezoelectric disks 318 causing mechanical deformation, a charge is created. A voltage signal, which is proportional to the charge, is measured to determine the extent of the mechanical deformation. Thus, the piezoelectric disks 318 also act as sensors for determining mechanical deformation.

Figure 6:
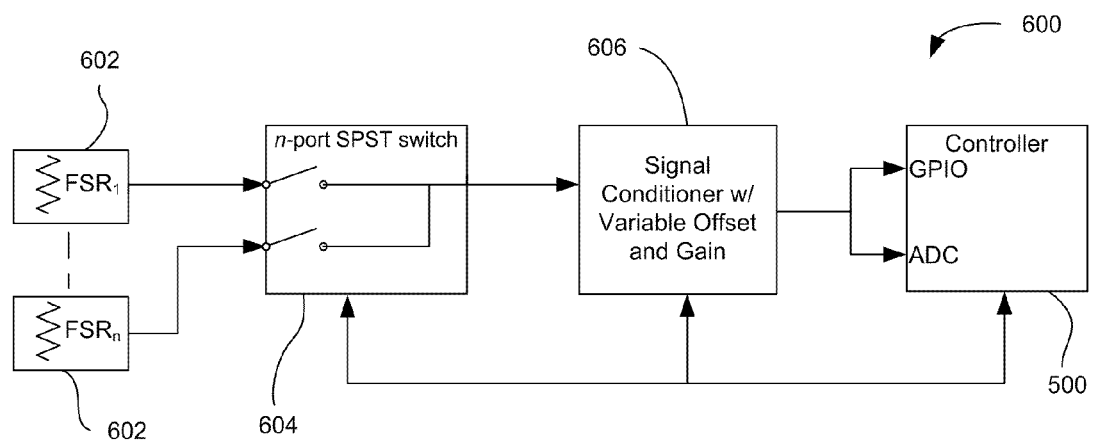
FIG. 6 is a block diagram of a circuit for controlling the force sensors of the portable electronic device in accordance with one example embodiment of the present disclosure.
Figure 7:
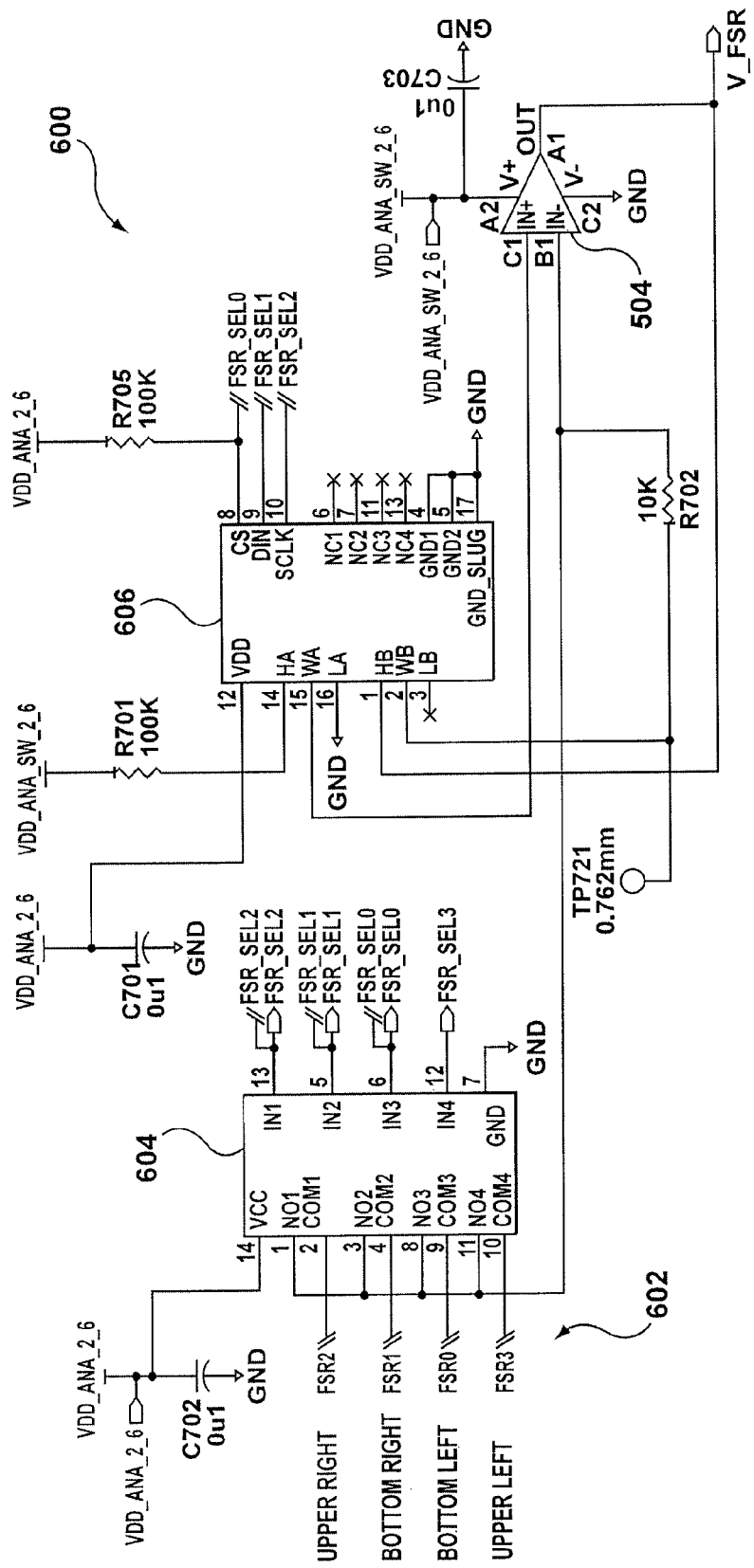
FIG. 7 is schematic diagram of a circuit for controlling the force sensors of the portable electronic device in accordance with one example embodiment of the present disclosure.

FIG. 6 shows a block diagram of a circuit 600 for controlling the force sensors 122 of the portable electronic device 100 according to one embodiment of the present disclosure. FIG. 7 is schematic diagram of an example circuit according to one embodiment of the present disclosure. The circuit 600 provides a wakeup detection circuit in some modes including, but not limited to (i) a full power mode in which normal, full functionality of the device 100 is provided; (ii) a sleep mode in which reduced functionality of the device 100 is provided; and (iii) an off mode in which the device 100 is powered-off and performs no functions or a minimized set of functions. As described above, the force sensors 122 measure the amount of applied force to the touch-sensitive display 118 (e.g., by the device user's fingers) and the touch-sensitive display 118 measures the location of touch events. The portable electronic device 100 described above provides a virtual click or "v-click" touchscreen which uses touch data and force data to generate click or unclick inputs and provide tactile feedback in response to click or unclick inputs using the piezoelectric disks 318 to actuate the touch-sensitive display 118. The touch-sensitive display 118 is actuated (or moved) up and down in response to the expansion and contraction of the piezoelectric disks 318 as described above. For convenience, the touch-sensitive display 118 is sometimes referred to as a touch sensor herein.

The circuit 600 consists of both analog and digital sections and provides a means of configuring a programmable response of the force sensors 122 to a user's press against the touch-sensitive display 118. In the shown example embodiment, the force sensors 122 comprise a number of force sensing resistors (FSRs) 602 for measuring applied force (or pressure). The resistance of the FSRs 602 change when a force or pressure is applied to them. The change in resistance causes a detectable voltage change. The FSRs 602 are numbered 1 to n where n is the total number of resistors. As described above in connection with FIG. 3A to 5, in some embodiments four FSRs 602 are used and located with a piezoelectric disk actuator 314 near a respective corner of the touch-sensitive display 118. The FSRs 602 may be disk-shaped or puck-shaped and may be located on top of the piezoelectric disks 318 and below the touch-sensitive display 118.

The FSRs 602 are each controlled by a digitally controlled switch. In the shown embodiment, the FSRs 602 are connected to an n-port switch 604 (also known as a multi-port switch) which comprises n single-pole, single-throw (SPST) switches. In embodiments in which four FSRs 602 are used, the n-port switch 604 comprises four SPST switches, one for each FSR 602. The n-port switch 604 controls which, if any, of the FSRs 602 report force data to host processor 102 (directly or indirectly). The n-port switch 604 and SPST switches are controlled by the controller 500 of FIG. 5.

The n-port switch 604 generates an output signal which is sent to a signal conditioning circuit or module 606 of the circuit 600. The signal conditioning module 606 can be used to offset (or bias) the FSRs 602 at various levels under the control of the controller 500. The signal conditioning module 606 can also be used to vary the sensitivity of the FSR response by varying the gain provided by the signal conditioning module 606. The controller 500 controls the variable offset and gain of the signal conditioning module 606. In at least some embodiments, the signal conditioning module 606 comprises digital potentiometers which are controlled by the controller 500 and utilized for adjusting and calibrating the response of the FSRs 602 and an operational amplifier (Op-Amp), while in other embodiments, analog potentiometers could be used. In other embodiments, the signal conditioning module 606 could be omitted depending on the configuration of the FSRs 602 or other force sensor 122 used in the circuit 600.

Typically, the FSRs 602 are pre-loaded with an amount of force as a result of the mechanical forces applied by the housing 200 and touch-sensitive display 118. The amount of pre-loading may vary between embodiments. The bias and gain of the FSRs 602 can be calibrated to account for the pre-loading and FSR sensitivity differences using the signal conditioning module 606, for example, using potentiometers. In the shown embodiment, the circuit 600 can be used to calibrate each FSR 602 individually by closing the respective switch in the n-port switch 604.

In other embodiments, rather than summing all of the FSRs 602 via the n-port switch 604 groups of FSRs 602 may be summed and evaluated independently. For example, when four FSRs 602 are used near the respective corners of the touch-sensitive display 108, the top pair of FSRs 602 and bottom pair of FSRs 602 could be summed and evaluated independently (e.g., groups of two FSRs 602 could be evaluated). These groupings could shift depending on whether the portable electronic device is in a portrait or landscape orientation. Alternatively, the left side and right sight FSRs 602 could be summed and evaluated independently. In yet other embodiments, individual FSRs 602 could be read/scanned and evaluated independently. A force event could be triggered (e.g. for a wakeup event) if all, any group or pair, or any one of the FSRs 602 measured a force which exceeds the predetermined wake force/pressure threshold. In other embodiments, other force sensing transducers comprising a force sensor such as a strain gauge or pressure sensor could be used to detect a force event (e.g. an applied force against the touch-sensitive display which exceeds the predetermined wake force/pressure threshold) instead of FSRs 602. Alternatively, the piezoelectric disk actuators 314 could be used to detect a force event.

The controller 500, in the shown embodiment of FIG. 6, includes a General Purpose Input/Output (GPIO). A GPIO is an interface which can act as input to read digital signals from other parts of the circuit 600 such as the signal conditioning module 606, or output digital signals to other parts of the circuit. The GPIO may be provided by a GPIO port having a number of individual GPIOs configurable as either input or outputs, and may be configurable to produce interrupts to the host processor 102. The controller 500 also includes an ADC 504 (FIG. 5) with a corresponding interface as described above. Alternatively, the controller 500 or signal conditioning block 606 could incorporate an analog comparator with a programmable reference for achieving the same. In some example embodiments, the controller 500 could be the electronic controller 116 of the touch-sensitive display 118 or the processor 102.

The portable electronic device 100 has several power modes: (i) a full power mode in which normal, full functionality of the device 100 is provided; (ii) a sleep mode in which reduced functionality of the device 100 is provided; and (iii) an off mode in which the device 100 is powered-off and performs no functions or a minimized set of functions. The sleep mode may be triggered by any one of a number of possible trigger conditions. The portable electronic device 100 monitors for one or more predetermined trigger conditions for entering the sleep mode. The one or more trigger conditions may be include any one or more of a selection of a sleep/standby option or device lock option via corresponding input, user inactivity for a predetermined duration, lack of wireless network coverage for a predetermined duration, a holstering or closing of the portable electronic device 100, or other suitable trigger condition. In response to detection of a trigger condition, the processor 102 initiates the sleep mode and notifies the controller 500 to initiate a sleep mode for the circuit 600. The controller 500 then proceeds to read (scan) the FSRs 602 for a wakeup event until either a wakeup force/pressure threshold is met, or the processor 102 signals the controller 500 to cease reading/scanning the FSRs 602. When the wakeup force threshold is exceeded, the controller 500 can signal an interrupt back to the processor 102 waking it from the sleep mode (or standby state).

In some embodiments, when in the sleep mode, power consumption is conserved by powering off the high frequency system clock and switching the controller 500 from the system clock to the sleep clock. This reduces the power consumption of the circuit 600. In the sleep mode, the sleep clock is used by the controller 500 and the host processor 102 is idle.

The controller 500 uses a sleep clock to schedule "on" and "off" time of the circuit 600 accordance with a predetermined duty cycle. The duty cycle is programmable and controls the balance between power consumption and response latency. In some embodiments, the n-port switch 604 is closed and the FSRs 602 are powered "on" for approximately 1 millisecond every 100 milliseconds. During this time, the controller 500 reads the FSRs 602 to detect force events, that is, to determine if a force greater than a predetermined amount of applied force (i.e., a force threshold) is read by one or more of the FSRs 602. After being powered-on for approximately 1 millisecond during the "on" time, the FSRs 602 are powered-off for 99 milliseconds by re-opening the n-port switch 604 for "off" time or inactive portion of the duty cycle. The FSRs 602 are powered-off for the remainder of the duty cycle.

The duration of the duty cycle may be selected to configure the duration of a force applied to the touch-sensitive display 118 (e.g., screen press) required to trigger a force event. For example, in some embodiments the duration of time which the FSRs 602 are read is configured to detect a "push and hold" or "press and hold" action caused by the device user pressing a finger against the touch-sensitive display 118 and holding it against the touch-sensitive display 118 for a predetermined duration such as, for example, approximately 100 milliseconds. The predetermined duration for a press and hold may be programmable/configurable, for example, to tune the wakeup function to the device user's habits or preferences and to filter out small ambient vibrations from normal movements, such as the device user walking with the device 100. For example, an inertial event caused by a tap event would occur and be over within a few milliseconds, e.g. approximately 20-25 milliseconds or less. The predetermined duration for a press and hold action is set to be longer than that of a typical tap event such as, for example, approximately 100 milliseconds. However, the predetermined duration could be more or less than 100 milliseconds and would typically be less than one second, and possibly less than 500 milliseconds. This means that any inertial event would have ended when the predetermined duration for detecting a press and hold event is reached. The touch-sensitive display 118 should also detect a tap event of the predetermined duration at the same time. Due to latency issues the forces measured by the force sensors 122 and the touches measures by the touch-sensitive display 118 may not be reported at the same time, however, these events can be synchronized or matched with each other.

In the shown example embodiment, the controller 500 configures the n-port switch 604 to sum the measurement of all of the FSRs 602 by closing each of the 4 SPST switches of the n-port switch 604 which are normally open, thereby connecting the FSRs 602 in parallel. The resultant output signal of the n-port switch 604 is then fed as input into the signal conditioning module 606. The variable offset and gain provided by the signal conditioning module 606 allows for a programmable response from the FSRs 602, thereby controlling the predetermined amount of applied force (i.e., force threshold) which is needed to trigger a force event.

As a result of summing of the readings of the FSRs 602 and a properly set force threshold, it is possible to trigger a force event when a device user presses on the touch-sensitive display 118 at any location. This occurs because a screen press under these conditions causes a force greater than or equal to the predetermined amount of applied force (i.e., the force threshold) to be detected on at least one of the FSRs 602. The force event will typically be detected by the FSR 602 closest to the location of the applied force on the touch-sensitive display 118 and possibly one or more of the other FSRs 602.

Force events are defined by applied forces greater than the force threshold. Force events can be detected using either analog or digital threshold comparator depending on the embodiment. In some embodiments, the analog signal output by the signal conditioning module 606 can be digitized by an ADC and then evaluated with a digital threshold comparator which can be implemented either in hardware or in software. For example, in some embodiments, force events could be detected by the controller's internal ADC 504 detecting that the analog signal has exceeded the force threshold. In other embodiments, force events could be detected by an analog comparator circuit (not shown) which triggers an interrupt to the controller 500 when the analog signal output by the signal conditioning module 606 exceeds the force threshold. The analog comparator can detect and signal a high/low output to the processor 102. When a force event is detected, the controller 500 sends a signal to the host processor 102 of the device 100 that an interrupt event was detected, and brings the portable electronic device 100 out of the sleep mode and into the full power mode. Wakeup events are defined by applied forces greater than a predetermined wakeup force threshold.

The described method of wakeup uses a relatively small amount of power while still allowing wakeup events to be detected. This functionality also reproduces the wakeup of a portable electronic device 100 caused by the collapse of a dome-type switch disposed between the touch-sensitive display 118 and housing 200 when the device user presses any where on the touch-sensitive display 118.

Figure 8:
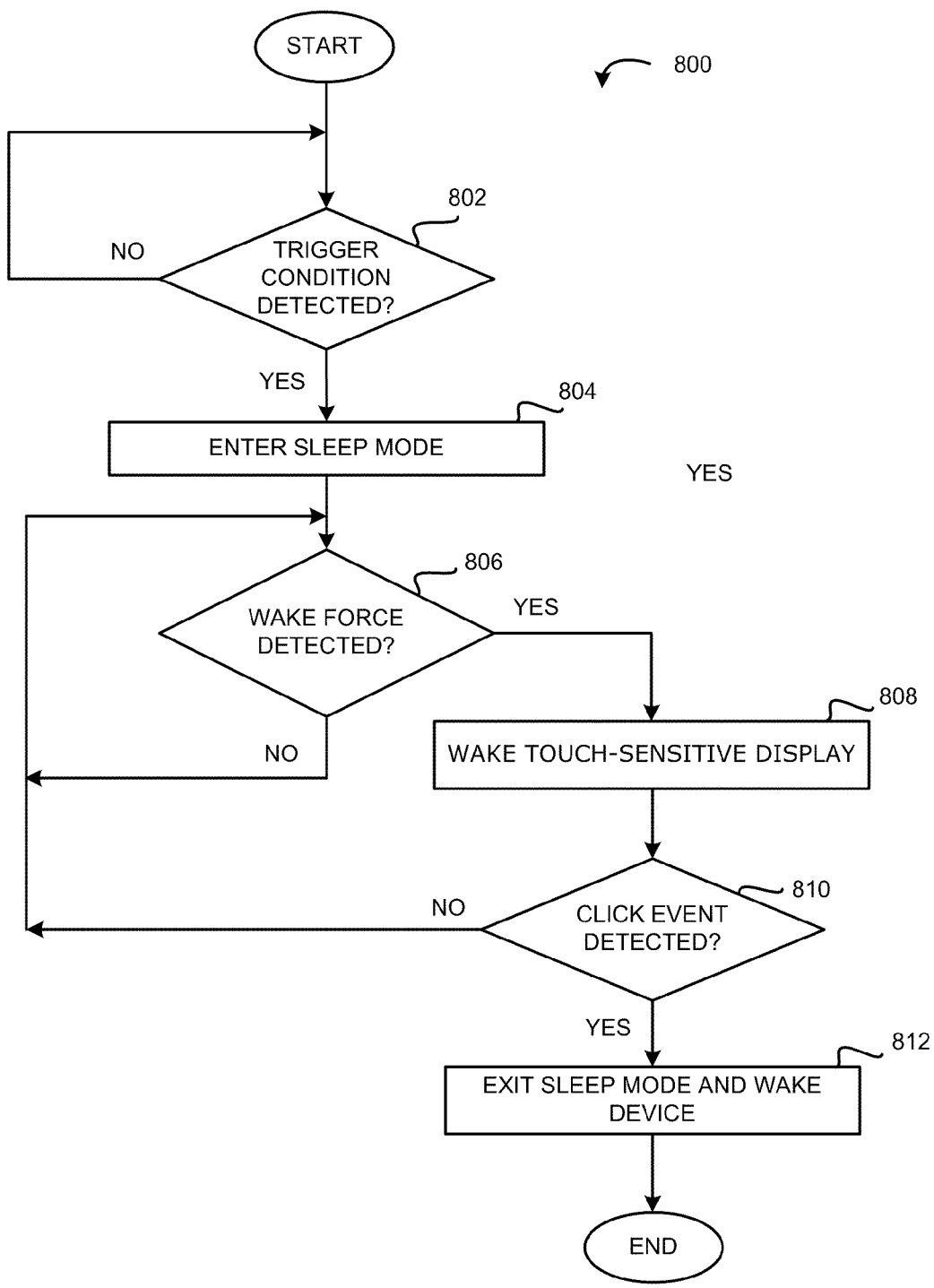
FIG. 8 is a flowchart illustrating a method of waking up a portable electronic device in accordance with one example embodiment of the present disclosure.

FIG. 8 shows a flowchart illustrating a method 800 of providing a sleep mode on the portable electronic device 100 and waking up the device 100 from the sleep mode in accordance with one example embodiment. The steps of FIG. 8 may be carried out by routines or subroutines of software executed by, for example, the processor 102. The coding of software for carrying out such steps is well within the scope of a person of ordinary skill in the art given the present disclosure. For example, the sleep mode may be implemented by a sleep process which operates in the background as part of the operating system 146.

In the first step 802, the processor 102 monitors for one or more predetermined trigger conditions for entering the sleep mode. The one or more trigger conditions may be include any one or more of a selection of a sleep/standby option via corresponding input or possibly a device lock option via corresponding input, user inactivity for a predetermined duration, lack of wireless network coverage for a predetermined duration, a holstering or closing of the portable electronic device 100, or other suitable trigger condition.

When one of the trigger conditions for entering the sleep mode is detected, the processor 102 initiates the sleep mode (step 804). The sleep mode may comprise the processor 102 switching from the system clock to the sleep clock and deactivating (e.g., powering off) the touch-sensitive display 118. When deactivated, the touch-sensitive display 118 does not measure touch data or detect touch events and its backlight is deactivated/disabled. In the sleep mode, the force sensors 122 continue to detect and measure forces applied to the touch-sensitive display 118. In at least some embodiments, the processor 102 instructs the controller 500 to initiate a sleep mode for the force sensor circuit 600 when one of the trigger conditions for entering the sleep mode is detected. In the sleep mode, the force sensors 122 operate at a reduced duty cycle relative to the full power mode and/or sample at a lower sampling rate relative to the full power mode to consume less power.

A locked mode may also be initiated in response to detecting one of the trigger conditions for entering a sleep mode when the sleep mode is itself triggered by a locking process, depending on the configuration of the locking process. In the locked mode, restrictions limiting interaction with the portable electronic device 100 are enforced. The restrictions typically affect at least some of its input interfaces/devices (e.g., overlay 114, auxiliary I/O 124, accelerometer 136) and at least some of its output interfaces/devices (e.g., display screen 112, speaker 128).

To reduce the power and resources consumed by the force sensor circuit 600, touch-sensitive display 118 and the host processor 102, the force sensors 122 and touch-sensitive display 118 can be put in a low reporting mode in which data is provided to the processor 102 only when a change in state of the respective sensor occurs. The low reporting mode can be contrasted with a full reporting mode in which the force sensors 122 and touch-sensitive display 118 provide data at regular scanning cycles irrespective of the state of the respective sensor. For the touch sensor 118, a change in the location of a touch event greater than a predetermined threshold or a change number of touches will trigger a change of state. For the force sensors 122, a change in state occurs when a force greater than a predetermined force threshold is detected by the force sensor controller 500 on all, any group or pair, or any one of the force sensors 122. A force greater than the predetermined force threshold is assumed to be a user finger applied to the touch-sensitive display 118. The predetermined force threshold for trigger a change in state is different from, and less than, the predetermined wake force threshold mentioned above.

In some embodiments, the sleep mode comprises changing the sampling of the force sensors 122 from the full reporting mode to the low reporting mode to consume less power. However, in other embodiments, the low reporting mode may be used by the force sensor 122 and possibly the touch-sensitive display 118 in both the full power mode and the sleep mode.

Next, in step 806 the force sensor controller 500 reads the force data output by the force sensors 122 and detects any wakeup force. The wakeup force is a force greater than the predetermined wake force threshold. This can be performed using analog or digital means as described above. When a wakeup force is detected, the force sensors 122 (e.g., and the circuit 600) wakeup from the sleep mode and return to the normal duty cycle and/or normal sampling rate of the full power mode, and touch-sensitive display 118 is reactivated (powered-up) so that touch data can be read/sampled for a predetermined duration (step 808). In other embodiments, the force sensors 122 could be maintained at the lower sampling rate of the sleep mode to consume less power when the touch-sensitive display 118 is reactivated. The force data and touch data are then read and it is determined whether a screen press or "click" has occurred or is in progress.

The backlight of the touch-sensitive display 118 may or may not be reactivated during the scanning/reading of the touch-sensitive display 118 which occurs in response to detection of a wakeup force, depending on the embodiment. For example, in some embodiments the backlight of the touch-sensitive display 118 is not activated until the wakeup event is confirmed by touch data read by the touch-sensitive display 118 to conserve power.

When the force data read by the forces sensors 122 and the touch data read by the touch-sensitive display 118 indicates a screen press or "click" has occurred or is in progress (step 810), the processor 102 wakes up from the sleep mode and returns to full power mode (step 812). If the processor 102 was switched from the system clock to the sleep clock during the sleep mode, the processor 102 switches back to the system clock. Other changes made when entering the sleep mode are also reversed. In at least some embodiments, the charge at each of the piezoelectric disks 318 is then be modulated to modulate the force applied by the piezoelectric disk actuators 314 on the touch-sensitive display 118 and to thereby cause movement of the touch-sensitive display 118 for simulating the collapse of a dome-type switch. This provides tactile or haptic feedback to the device user so that they know a screen press or "click" was registered by the device 100.

If a screen press or "click" is not detected, the touch-sensitive display 118 is deactivated again until being reactivated by the detection of another wakeup force, and the force sensors 122 are returned to the lower duty cycle and/or lower sampling rate of the sleep mode.

As will be appreciated by persons skilled in the art, sampling forces and touches applied to the touch-sensitive display 118 consumes scarce device power. During normal operation, this sampling occurs at a high rate to keep up with user interaction with the touch-sensitive display 118. However, when the portable electronic device 100 is idle a high sampling rate needlessly consumes power resulting in a shorter life for the power source 142. The present disclosure provides a method and portable electronic device 100 which aims to minimize, or at least reduce, the power consumed when the portable electronic device 100 while still clicking in response to forces.

To reduce the power and processing resources consumed, the present disclosure provides a sleep mode which deactivates the touch-sensitive display 118 when the device 100 is idle and uses the force sensors 122 to sample force data at a lower sampling rate to detect a potential wakeup when a force greater than the predetermined wakeup force threshold is detected. The sleep mode described in the present disclosure aims to minimize, or at least reduce, the power consumed when the portable electronic device 100 is idle while also registering screen presses or "clicks" in response to applied forces and optionally providing tactile/haptic feedback by modulating the charge at each of the piezoelectric disks 318 to modulate the force applied by the piezoelectric disk actuators 314.

Moreover, the predetermined wakeup force threshold may be set so as to filter out small applied forces such as ambient forces resulting from normal movements of the portable electronic device 100 (such as those applied to the device 100 while in a user's pocket while walking), while still detecting a finger pressing against touch-sensitive display 118. This avoids unnecessary wakeup event checks by limiting the applied forces which will be detected as potential wakeup events.

Figure 9:
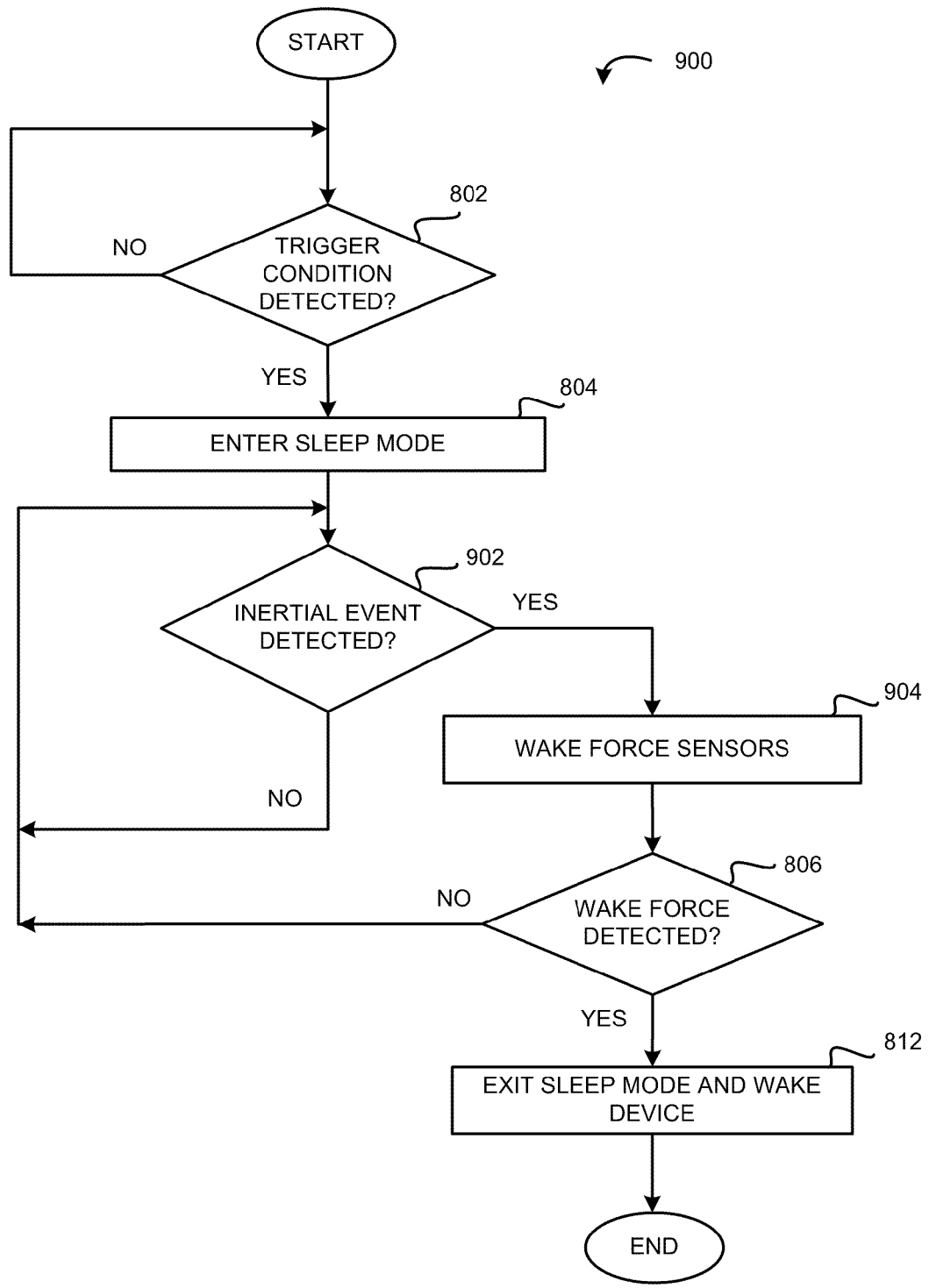
FIG. 9 is a flowchart illustrating a method of waking up a portable electronic device in accordance with another example embodiment of the present disclosure.

FIG. 9 shows a flowchart illustrating a method 900 of providing a sleep mode on the portable electronic device 100 and waking up the device 100 from the sleep mode in accordance with another example embodiment. The steps of FIG. 9 may be carried out by routines or subroutines of software executed by, for example, the processor 102. The coding of software for carrying out such steps is well within the scope of a person of ordinary skill in the art given the present disclosure. For example, the sleep mode may be implemented by a sleep process which operates in the background as part of the operating system 146.

In steps 802 and 804, the processor 102 monitors for one or more trigger conditions for enter a sleep mode, and enters a sleep mode in response to detection of one of the trigger conditions as described above. In the sleep mode of the embodiment shown in FIG. 9, the forces sensors 122 are not read by the controller 500. As a result, the force sensors 122 or the entire circuit 600 may be powered-off to consume less power. In some embodiments, the circuit 600 has a non-power cycled current draw of approximately 80 μA which can be reduced by powering down the forces sensors 122. In other embodiments, the force sensors 122 could be operated at a reduced/slower duty cycle relative to the full power mode and/or sample at a lower sampling rate relative to the full power mode to consume less power as in the method 800 of FIG. 8.

Next, in step 902 the accelerometer 136 is used to detect an inertial event. The inertial event could be a tap on the touch-sensitive display 118, a movement of the device 100 causing a change in acceleration which exceeds a predetermined threshold, or possible a predetermined movement or gesture performed by moving the device 100 in a predetermined manner (this motion being detected by the accelerometer 136).

A gesture is a predetermined motion performed by moving the device 100 in a predetermined manner such as a predetermined direction or series of directions. Gestures are identified by comparing the accelerations measured by the accelerometer 136 to reference data for the predetermined motions to determine whether the detected motion is characteristic of one of the predetermined motions. This is typically performed by the host processor 102 using acceleration data provided by the accelerometer 136, but could be performed via a built-in electronic controller of the accelerometer 136. The predetermined inputs could be a forward movement, backward movement, up movement, down movement, left movement, right movement, tilt left movement, tilt right movement, swing left movement, swing right movement or any other predetermined movement such as a movement which approximate a letter, number of symbol, or a series of such movements. In some embodiments, a horizontal tilt or swing movement (i.e., a left or right horizontal tilt or swing movement) and vertical tilt or swing movement (i.e., an up or down tilt or swing movement). Alternatively, a left tilt or swing movement, right tilt or swing movement, up tilt or swing movement and down tilt or swing movement could each be distinct predetermined inputs.

In some example embodiments, the inertial event could be a tap on the touch-sensitive display 118 and the accelerometer 136 is a digital accelerometer having a built-in tap detection function which may be used to detect a tap on the touch-sensitive display 118. Many commercially available digital accelerometers have a built-in tap detection function. Any digital accelerometer having a built-in tap detection function could be used. The tap detect threshold used by the built-in tap detection function may be programmable/configurable and set so as to filter out small ambient vibrations from normal movements, such as the device user walking with the device 100.

Alternatively, rather than a digital accelerometer an analog accelerometer with an analog comparator circuit (not shown) with a programmable/configurable reference could be used. The programmable reference acts as a predetermined acceleration threshold for an inertial event. The analog comparator circuit sends an interrupt to the controller 500 when the analog output signal of the analog accelerometer exceeds the programmable reference.

The accelerometer 136 may also be power-cycled to lower the sampling rate and conserve power when the device 100 is idle, for example, when the acceleration reading has not changed by more than a predetermined amount for a predetermined duration. Power-cycling of the accelerometer 136 may occur automatically as part of entering the sleep mode. When the acceleration exceeds this amount, the accelerometer 136 returns to the higher sampling rate to reduce latency in detection acceleration. In some example embodiments, the accelerometer 136 could have autonomous power cycling that can reduce current consumption to approximately 25 μA or less.

When an inertial event is detected, an interrupt is sent from the accelerometer 136 or a comparator circuit for the accelerometer 136 to the controller 500 to wake the force sensors 122 (step 904). As noted above, waking the force sensors 122 may comprise powering on the force sensors 122, increasing from a lower sampling rate of the sleep mode to a higher sampling rate (e.g., normal sampling rate of the full power mode), depending on the configuration of the sleep mode. Alternatively, the interrupt could be sent to the host processor 102, or to both the controller 500 and processor 102.

Next, in step 806 the force data output by the force sensors 122 is read by the force sensor controller 500 of the circuit 600 which detects any wakeup force. This can be done via analog or digital means as described above. In some embodiments in which sleeping and waking the force sensors 122 comprises powering down and powering up the force sensors, the process of powering up the force sensors 122 and taking a measurement may take approximately 1 millisecond or less depending on the design of the signal conditioning module 606. This amount of time is sufficiently short that a wakeup force caused by an inertial event should, in at least most circumstances, still be present when the force sensors 122 wake. If no wakeup force is present when the force sensors 122 wake, the inertial event is considered to be erroneous and caused by something other than a screen press or "click".

When a wakeup force is detected, the touch-sensitive display 118 is reactivated/powered-up and the processor 102 wakes up from the sleep mode and returns to full power mode (step 812). If the processor 102 was switched from the system clock to the sleep clock during the sleep mode, the processor 102 switches back to the system clock. Other changes made to when entering the sleep mode are also reversed. In at least some embodiments, the charge at each of the piezoelectric disks 318 is modulated to modulate the force applied by the piezoelectric disk actuators 314 on the touch-sensitive display 118 and to thereby cause movement of the touch-sensitive display 118 for simulating the collapse of a dome-type switch. This provides tactile or haptic feedback to the device user so that they know a screen press or "click" was registered by the device 100.

If a wakeup force is not detected, the force sensors 122 are deactivated/powered-off again and returned to the sleep mode until being reactivated by the detection of another inertial event.

The method 900 provides a wakeup solution which uses inertial events to trigger a device wakeup and a force event to verify this trigger. The inertial event could be a movement of the device 100 or a tap on the touch-sensitive display 118. For example, in some embodiments the device could be configured to use a "press and hold" event as a wakeup event. In a press and hold event, the user presses or taps on the touch-sensitive display 118 with a finger to create an inertial event and presses on the touch-sensitive display 118 for a predetermined duration to create a force event. The touch-sensitive display 118 should also detect a tap event of the predetermined duration at the same time. Due to latency issues the forces measured by the force sensors 122 and the touches measures by the touch-sensitive display 118 may not be reported at the same time, however, these events can be synchronized or matched with each other. The inertial event will have ended when the predetermined duration for detecting a press and hold event is reached. The press and hold event will trigger a wakeup as described above.

In an alternate embodiment, the force sensors 122 are not affected by the sleep mode. In the sleep mode, the touch-sensitive display 118 and host processor 102 are put to sleep as described above and the accelerometer 136 is used to monitor for inertial events which, when detected, trigger an increase in the duty cycle and/or sampling rate of the force sensors 122 in order to reduce the latency in detecting wakeup events in the form of force events.

Figure 10:
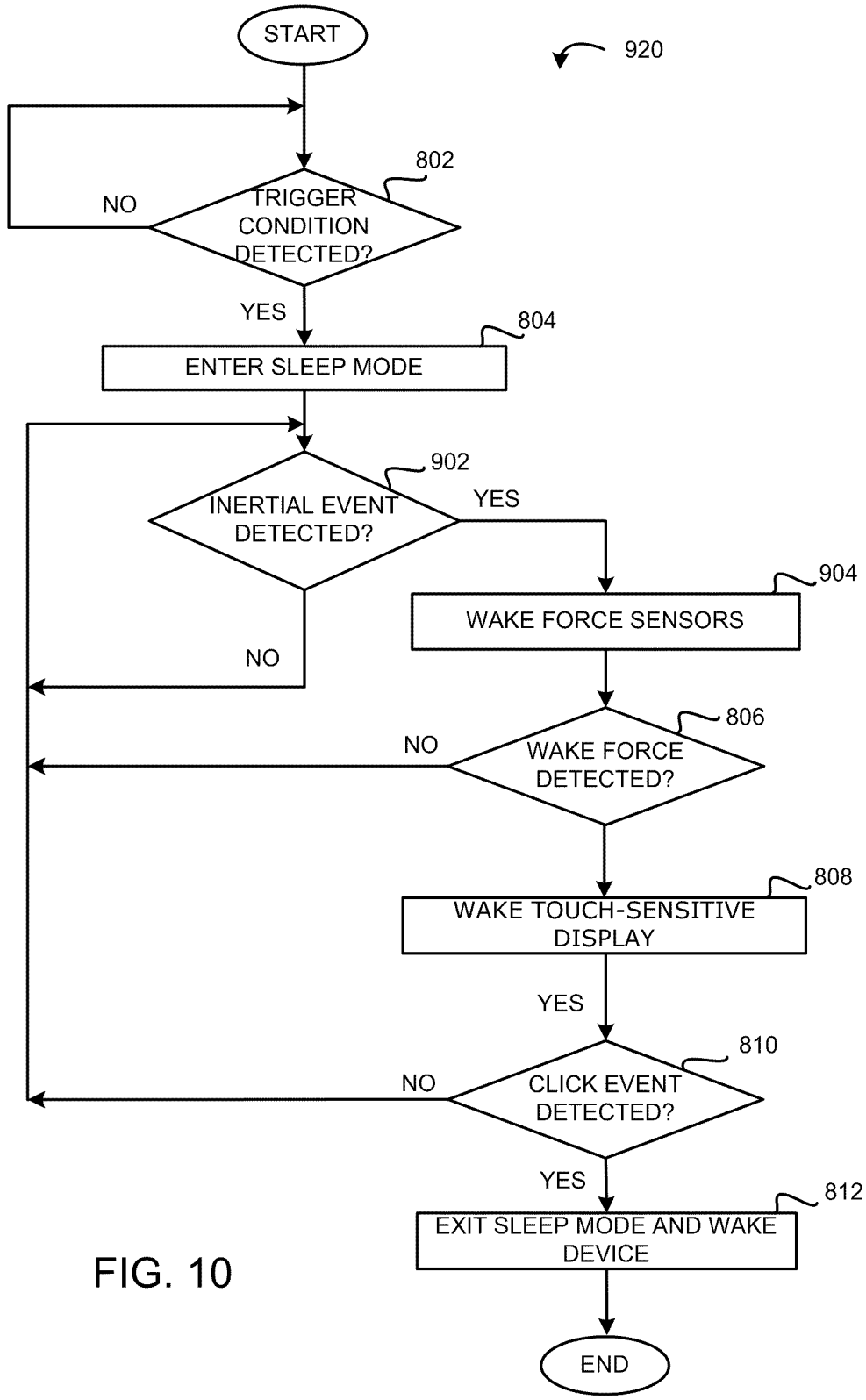
FIG. 10 is a flowchart illustrating a method of waking up a portable electronic device in accordance with a further example embodiment of the present disclosure.

FIG. 10 shows a flowchart illustrating a method 920 of providing a sleep mode on the portable electronic device 100 and waking up the device 100 from the sleep mode in accordance with a further example embodiment. The steps of FIG. 10 may be carried out by routines or subroutines of software executed by, for example, the processor 102. The coding of software for carrying out such steps is well within the scope of a person of ordinary skill in the art given the present disclosure. For example, the sleep mode may be implemented by a sleep process which operates in the background as part of the operating system 146.

The method 920 comprises the steps 802, 804, 902, 904 and 806 described above in connection with the method 900 of FIG. 9. However, the force sensors 122 measure force at a reduced rate in the sleep mode as in the method 800 of FIG. 8. When a wakeup force is detected, the force sensors 122 (e.g., and the circuit 600) wakeup from the sleep mode and return from a reduced duty cycle of the sleep mode to the normal duty cycle and/or normal sampling rate of the full power mode, and touch-sensitive display 118 is reactivated (powered-up) so that touch data can be read/sampled for a predetermined duration (step 808).

When the force data read by the forces sensors 122 and the touch data read by the touch-sensitive display 118 indicates a screen press or "click" has occurred or is in progress (810), the processor 102 wakes up from the sleep mode and returns to full power mode (step 812). If the processor 102 was switched from the system clock to the sleep clock during the sleep mode, the processor 102 switches back to the system clock. Other changes made when entering the sleep mode are also reversed. In at least some embodiments, the charge at each of the piezoelectric disks 318 is then be modulated to modulate the force applied by the piezoelectric disk actuators 314 on the touch-sensitive display 118 and to thereby cause movement of the touch-sensitive display 118 for simulating the collapse of a dome-type switch. This provides tactile or haptic feedback to the device user so that they know a screen press or "click" was registered by the device 100.

If a screen press or "click" is not detected, the touch-sensitive display 118 is deactivated again until being reactivated by the detection of another wakeup force, and the force sensors 122 are returned to the lower duty cycle and/or lower sampling rate of the sleep mode.

The method 920 is similar to the method 800 of FIG. 8 but adds inertial event detection using the accelerometer 136 from the method 900 of FIG. 9 to verify potential wakeup events which an aim to reduce the false "wakeups" which may result, for example, from a finger moving across the touch-sensitive display 118.

In an alternate embodiment, the force sensors 122 are not affected by the sleep mode. In the sleep mode, the touch-sensitive display 118 is deactivated and host processor 102 is idled as described above and the accelerometer 136 is used to monitor for inertial events which, when detected, trigger an increase in the duty cycle and/or sampling rate of the force sensors 122 in order to reduce the latency in detecting wakeup events in the form of force events. In another alternate embodiment, detection of the inertial event could wake both the force sensors 122 and touch-sensitive display 118 at the same time.

In some embodiments, the detection of an inertial event could cause the duty cycle and/or the sampling rate of the touch-sensitive display 118 to be increased to reduce the latency in wakeup event detection caused by the relatively long scan cycle of the touch-sensitive display 118.

Figure 11:
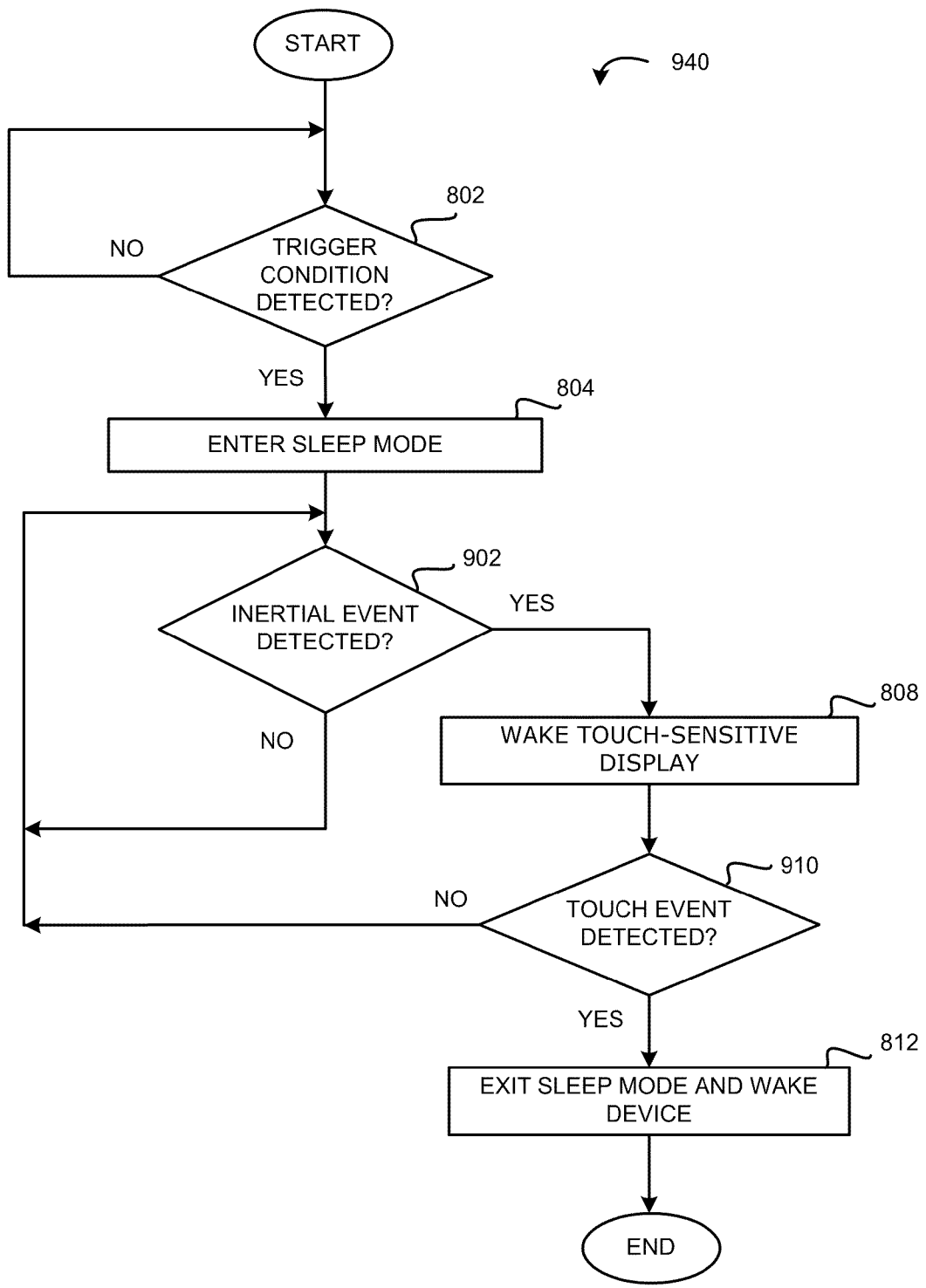
FIG. 11 is a flowchart illustrating a method of waking up a portable electronic device in accordance with another example embodiment of the present disclosure.

FIG. 11 shows a flowchart illustrating a method 940 of providing a sleep mode on the portable electronic device 100 and waking up the device 100 from the sleep mode in accordance with a further example embodiment. The steps of FIG. 11 may be carried out by routines or subroutines of software executed by, for example, the processor 102. The coding of software for carrying out such steps is well within the scope of a person of ordinary skill in the art given the present disclosure. For example, the sleep mode may be implemented by a sleep process which operates in the background as part of the operating system 146.

The method 940 comprises the steps 802, 804 and 902 as described above. However, the detection of an inertial event is used to reactivate (power-up) the touch-sensitive display 118 so that touch data can be read/sampled for a predetermined duration (step 808) rather than waking up force sensors 122. The force sensors 122 are not used in the process 940 and could be omitted from a device 100 which implements this method. When the touch data read by the touch-sensitive display 118 indicates a touch event has occurred or is in progress (step 910), the processor 102 wakes up from the sleep mode and returns to full power mode (step 812). If the processor 102 was switched from the system clock to the sleep clock during the sleep mode, the processor 102 switches back to the system clock. Other changes made when entering the sleep mode are also reversed. The charge of the piezoelectric disks 318 is not modulated and no tactile or haptic feedback is provided to the device user. In such embodiments, the force sensors 122 and actuators 120 (e.g. piezoelectric disk actuators 314) could be omitted.

If a touch event is not detected (step 810), the touch-sensitive display 118 is deactivated again until being reactivated by the detection of another inertial event.

The method 940 is similar to the method 900 of FIG. 9 but does not use the force sensors 122 to detect wakeup events. Instead, the inertial event detection function provided by the accelerometer 136 is used to wake the touch-sensitive display 118, and the touch data measured by the touch-sensitive display 118 is used verify potential wakeup events which an aim to reduce the false "wakeups" which may result from using only the inertial event detection function as a wakeup event. That is, a touch event must be detected within a predetermined duration of when the touch-sensitive display 118 wakes up. The charge of the piezoelectric disks 318 is not modulated and no tactile or haptic feedback is provided to the device user.

The present disclosure teaches a method and portable electronic device which combines measurements from two or more independent sensors to confirm the detection of a wakeup event for a portable electronic device 100, thereby reducing false-positives. In some embodiments, such as the method 800, force data provided by force sensors 122 is combined with touch data provided by a touch-sensitive display 118 to verify potential wakeup events with an aim to reduce the false "wakeups".

In some embodiments, such as the method 900 and 920, inertial event detection provided by the accelerometer 136 is combined with force data provided by the force sensors 122 to verify potential wakeup events which an aim to reduce the false "wakeups" which may result from a finger moving across the touch-sensitive display 118. The time correlation of the interrupt signal from the threshold crossing event of accelerometer 136 and the interrupt signal from the threshold crossing event of force sensors 122 may be used to reliably detect a device wakeup event at relatively low power and complexity.

In some embodiments, such as the method 900 and 920, the power draw of the sleep mode may be reduced by powering off both the touch-sensitive display 18 and force sensors 122 while powering only the accelerometer 136. In some embodiments, further power savings may be realized by power cycling the accelerometer 136.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of conserving power on a portable electronic device, the portable electronic device having a device housing which comprises a touch-sensitive display moveable between a first position and second position relative to the device housing, an accelerometer, and a force sensing transducer located beneath a back side of the touch-sensitive display opposite to a touch-sensitive overlay of the touch-sensitive display, the method comprising:
  causing the portable electronic device to enter a sleep mode in response to a trigger condition, wherein the touch-sensitive display is deactivated in the sleep mode and the force sensing transducer measures compressive forces applied to the touch-sensitive display at a reduced rate relative to a rate of a full power mode when in the sleep mode;
  detecting an inertial event using the accelerometer;
  causing the force sensing transducer to measure compressive forces applied to the touch-sensitive display at the rate of the full power mode in response to detection of the inertial event;
  using the force sensing transducer at the rate of the full power mode, detecting compressive forces applied to the touch-sensitive display;
  causing the touch-sensitive display to be reactivated in response to detection of a compressive force which is greater than a predetermined wake force threshold and which is indicative of a screen press;
  detecting touch events on the touch-sensitive display; and
  causing the portable electronic device to wake from the sleep mode in response to detection of a touch event within a first predetermined duration of the detection of the compressive force which is greater than the predetermined wake force threshold.

2. The method of claim 1, wherein causing of the portable electronic device to wake from the sleep mode only occurs when the touch event exceeds a second predetermined duration and the predetermined wake force threshold is exceeded for the second predetermined duration.

3. The method of claim 2, wherein the second predetermined duration exceeds a duration of inertial events comprising taps.

4. A method of conserving power on a portable electronic device, the portable electronic device having a device housing which comprises a touch-sensitive display moveable between a first position and second position relative to the device housing and a force sensing transducer located beneath a back side of the touch-sensitive display opposite to a touch-sensitive overlay of the touch-sensitive display, the method comprising:
  causing the portable electronic device to enter a sleep mode in response to a trigger condition, wherein the touch-sensitive display is deactivated in the sleep mode;
  using the force sensing transducer, detecting compressive forces applied to the touch-sensitive display;
  causing the touch-sensitive display to be reactivated in response to detection of a compressive force which is greater than a predetermined wake force threshold and which is indicative of a screen press;
  detecting touch events on the touch-sensitive display; and
  causing the portable electronic device to wake from the sleep mode in response to detection of a touch event within a first predetermined duration of the detection of the force which is greater than the predetermined wake force threshold.

5. The method of claim 4, wherein the force sensing transducer measures compressive forces applied to the touch-sensitive at a reduced rate relative to a rate of a full power mode when in the sleep mode.

6. The method of claim 5, further comprising:
  causing the force sensing transducer to measure compressive forces applied to the touch-sensitive display at the rate of the full power mode in response to detection of a force which is greater than the predetermined wake force threshold.

7. The method of claim 6, wherein the force sensing transducer is powered-off in the sleep mode, wherein the force sensing transducer is powered-on to measure compressive forces applied to the touch-sensitive display at the rate of the full power mode in response to detection of a force which is greater than the predetermined wake force threshold.

8. The method of claim 4, wherein causing of the portable electronic device to wake from the sleep mode only occurs when the touch event exceeds a second predetermined duration and the predetermined wake force threshold is exceeded for the second predetermined duration.

9. A method of conserving power on a portable electronic device, the portable electronic device having a device housing which comprises a touch-sensitive display moveable between a first position and second position relative to the device housing, an accelerometer, and a force sensing transducer located beneath a back side of the touch-sensitive display opposite to a touch-sensitive overlay of the touch-sensitive display, the method comprising:
    causing the portable electronic device to enter a sleep mode in response to a trigger condition, wherein the touch-sensitive display is deactivated in the sleep mode and the force sensing transducer measures compressive forces applied to the touch-sensitive display at a reduced rate relative to a rate of a full power mode when in the sleep mode;
    detecting an inertial event using the accelerometer;
    causing the force sensing transducer to measure compressive forces applied to the touch-sensitive display at the rate of the full power mode in response to detection of the inertial event;
    using the force sensing transducer at the rate of the full power mode, detecting compressive forces applied to the touch-sensitive display; and
    causing the touch-sensitive display to be reactivated and causing the portable electronic device to wake from the sleep mode in response to detection of a touch event within a first predetermined duration of the detection of a compressive force which is greater than a predetermined wake force threshold and which is indicative of a screen press.

10. The method of claim 9, wherein causing the touch-sensitive display to be reactivated and causing of the portable electronic device to wake from the sleep mode only occurs when the predetermined wake force threshold is exceeded for a second predetermined duration.

11. The method of claim 1, further comprising:
    causing movement of the touch-sensitive display relative to the device housing which simulates the collapse of a dome-type switch.

12. The method of claim 11, wherein the portable electronic device comprises at least one piezoelectric element resiliently biased and located beneath the back side of the touch-sensitive display opposite to the touch-sensitive overlay of the touch-sensitive display, the movement of the touch-sensitive display being caused by modulating a charge of the piezoelectric element thereby providing haptic feedback which simulates the collapse of a dome-type switch.

13. The method of claim 12, comprising a plurality of piezoelectric elements resiliently biased and located beneath the back side of the touch-sensitive display opposite to the touch-sensitive overlay of the touch-sensitive display, the movement of the touch-sensitive display being caused by modulating the charge of the piezoelectric elements thereby providing haptic feedback which simulates the collapse of a dome-type switch.

14. The method of claim 13, wherein the plurality of piezoelectric elements comprise four piezoelectric disks, each piezoelectric disk being located near a respective corner of the touch-sensitive display.

15. The method of claim 1, wherein the force sensing transducer is located beneath a back side of the touch-sensitive display opposite to a touch-sensitive overlay of the touch-sensitive display, the force sensing transducer measuring compressive forces applied to the touch-sensitive overlay of the touch-sensitive display.

16. The method of claim 15, comprising a plurality of force sensing transducers, wherein a sum of force data measured by the force sensing transducers is used to determine whether an applied force is greater than the predetermined wake force threshold.

17. The method of claim 16, wherein the force sensing transducers are force sensing resistors.

18. The method of claim 17, wherein the force sensing transducers comprise four force sensing resistors, each force sensing resistor being located near a respective corner of the touch-sensitive display.

19. A portable electronic device, comprising:
    a housing;
    a processor received within the housing;
    a touch-sensitive display connected to the processor and exposed by the housing, the touch-sensitive display moveable between a first position and second position relative to the device housing and having a touch-sensitive overlay detecting touch events;
    an accelerometer received within the housing connected to the processor and measuring inertial events;
    at least one force sensing transducer located below the touch-sensitive display on an opposite side to the touch-sensitive overlay, the at least one force sensing transducer being connected to the processor and measuring compressive forces applied to the touch-sensitive display;
    wherein the processor is configured for: causing the portable electronic device to enter a sleep mode in response to a trigger condition, wherein the touch-sensitive display is deactivated in the sleep mode and the force sensing transducer measures compressive forces applied to the touch-sensitive display at a reduced rate relative to a rate of a full power mode when in the sleep mode; detecting an inertial event using the accelerometer; causing the force sensing transducer to measure compressive forces applied to the touch-sensitive display at the rate of the full power mode in response to detection of the inertial event; using the force sensing transducer at the rate of the full power mode, detecting compressive forces applied to the touch-sensitive display; causing the touch-sensitive display to be reactivated in response to detection of a compressive force which is greater than a predetermined wake force threshold and which is indicative of a screen press;
    detecting touch events on the touch-sensitive display; and causing the portable electronic device to wake from the sleep mode in response to detection of a touch event within a first predetermined duration of the detection of the compressive force which is greater than the predetermined wake force threshold.

* * * * *